United States Patent [19]

Tabata

[11] Patent Number: 4,893,800
[45] Date of Patent: Jan. 16, 1990

[54] ELECTRONICALLY CONTROLLED VIBRATION DAMPER FOR MOUNTING AUTOMOTIVE INTERNAL COMBUSTION ENGINES AND THE LIKE

[75] Inventor: Toshiyuki Tabata, Sagamihara, Japan

[73] Assignee: Nissan Motor Company, Limited, Yokohama, Japan

[21] Appl. No.: 231,014

[22] Filed: Aug. 11, 1988

[30] Foreign Application Priority Data

Aug. 11, 1987 [DE] Fed. Rep. of Germany .... 62-201191

[51] Int. Cl.4 .................... F16M 5/00; F16M 13/00; F16F 15/03
[52] U.S. Cl. ................... 267/140.1; 188/267; 248/562
[58] Field of Search ........ 267/35, 140.1, 219, 267/140.1 A, 140.1 AE, 140.1 E; 188/322.5, 267; 180/300, 312; 248/562, 636, 550, 566

[56] References Cited

U.S. PATENT DOCUMENTS

| | | | |
|---|---|---|---|
| 3,599,428 | 8/1971 | Chaney | 60/326 |
| 4,466,909 | 8/1984 | Stayner | 252/32.7 E X |
| 4,671,227 | 6/1987 | Hollerweger et al. | 248/636 |
| 4,693,455 | 9/1987 | Andra | 267/140.1 |
| 4,720,087 | 1/1988 | Duclos et al. | 267/140.1 |
| 4,742,998 | 5/1988 | Schubert | 267/136 |
| 4,754,956 | 7/1988 | Barone et al. | 267/219 X |
| 4,757,981 | 7/1988 | Hartel | 267/140.1 |
| 4,759,534 | 7/1988 | Hartel | 267/140.1 |
| 4,773,632 | 9/1988 | Hartel | 267/140.1 |
| 4,778,158 | 10/1988 | Hoying et al. | 267/140.1 |

FOREIGN PATENT DOCUMENTS

| | | | |
|---|---|---|---|
| 60-104828 | 6/1985 | Japan . | |
| 0116937 | 6/1985 | Japan | 267/140.1 |
| 61-74930 | 4/1986 | Japan . | |
| 0146623 | 7/1986 | Japan | 180/300 |

Primary Examiner—Robert J. Oberleitner
Attorney, Agent, or Firm—Foley & Lardner, Schwartz, Jeffery, Schwaab, Mack, Blumenthal & Evans

[57] ABSTRACT

A power unit mount includes a housing in which first and second electrode bodies are suspended and which is filled with a fluid which exhibits a change in viscosity when a voltage is applied thereacross. The control of the voltage application is determined by a control circuit which is operatively connected to a plurality of sensors which include an engine speed sensor, a road wheel speed sensor, a relative displacement sensor and an absolute displacement sensor. A variant includes a solenoid powered vibration generator which can be energized under predetermined conditions in a manner to improve vibration attenuation.

8 Claims, 8 Drawing Sheets

ELECTRONICALLY CONTROLLED VIBRATION DAMPER FOR MOUNTING AUTOMOTIVE INTERNAL COMBUSTION ENGINES AND THE LIKE

BACKGROUND OF THE INVENTION

1. Field of the Invention

The present invention relates to engine mounts which include fluid filled elastomeric members and more specifically to such a type of vibration damping mount which includes electrodes which are immersed in an rheopetic fluid and across which a voltage can be applied in order to change the damping characteristics of the device.

2. Description of the Prior Art

FIG. 1 shows a vehicle suspension system in terms of a model having two degrees of freedom. In this model $M_p$ denotes a vibrating body such as an automotive internal combustion engine and transaxle (hereinafter referred to as a power unit), $M_b$ denotes a vehicle chassis on which the engine is supported and G the surface of a road on which the vehicle is running. The engine mounts are depicted as having a spring constant $k_1$ and a damping coefficient $c_1$ while the vehicle suspension is depicted as exhibiting a spring constant $k_2$ and a damping coefficient $c_2$.

This system is such that, if we examine the damping coefficient c parameter in terms of applied vibration frequency and the change in the amount of vibration energy transmitted to the vehicle chassis, it will be apparent from FIG. 11 that about the point P, beyond which the vibration enters a high frequency range, the damping characteristics undergo a change. As the vibration frequency increases into the high frequency range, the value of the damping coefficient increases toward a peak value (note $c=$infinity trace) and thus attentuation of the vibration level transmitted to the chassis is possible.

It is common to use mounts comprised almost exclusively of elastomeric materials (viz., solid rubber blocks and the like) for mounting an engine and/or transmission arrangement (power unit). However, if it is attempted to increase the damping coefficient $c_1$ of the mounting units, the elastomeric material tends to become harder and the spring constant $k_1$ simultaneously increases. This increases the situation wherein Ftotal (Ftotal=Fc+Fk) cannot be held at desired levels.

In view of this, it has been proposed in JP-A-61-74930 to make use of a liquid column which is defined within an orifice arrangement and which column can be induced to resonate. The orifice in this device is arranged to be variable by utilizing a fluid which exhibits rheopetic properties and by selectively impressing a voltage across electrodes which form a part thereof.

However, with this arrangement even though in a particular frequency range in the low frequency region the dynamic damper functions to control vibration, and in the high frequency region the dynamic spring constant is low, the range in which attenuation of the vibration which is transmitted to the chassis occurs, is narrow. Further, the use of a rheopectic fluid permits the above mentioned range to be enlarged by only a small amount. Hence, no substantial improvement in damping characteristics is achieved by this measure.

SUMMARY OF THE INVENTION

It is an object of the present invention to provide a damping device which effectively attenuates vibration which tends to be applied to a vehicle chassis or the like, from both the engine and the vehicle suspension, over a wide frequency range.

In brief, the above object is achieved in an arrangement wherein a power unit mount includes a housing in which a first and second electrode bodies are suspended and which is filled with a fluid which exhibits a change in viscosity when a voltage is applied thereacross. The control of the voltage application is determined by control circuit which is operatively connected to a plurality of sensors which include an engine speed sensor, a road wheel speed sensor, a relative displacement sensor and an absolute displacement sensor. A variant includes a solenoid powered vibration generator which can be energized under predetermined conditions in a manner to improve vibration attenuation.

More specfically, the present invention is deemed to comprise a system which features: a first vibratable body; a second vibratable body; first and second suspension systems, said first suspension system suspending said first body on said second body, and said second suspension system suspending said second body on a surface, said first suspension system including a mounting device for damping a vibration which is applied to said second body from said first body by way of said first suspension and from said surface by way of said second suspension, said suspension including a mounting device comprising: a housing in which a fluid exhibiting rheopetic properties is disposed; first and second electrode bodies suspended in said housing in a manner to be immersed in said rheopetic fluid, said first electrode body operatively connected with said first body to be movable therewith, said second body being connected to said housing through a resilient member, said rheopetic fluid undergoing a change in viscosity when a voltage is applied across said first and second electrode bodies; a spring which is connected to said first body and which is subject to compression when the relative displacement between said first and second bodies decreases; sensor means for sensing: the absolute displacement of said mount; the relative displacement of said mount; a first predetermined parameter which varies with the vibration produced by said first body; and a second predetermined parameter which varies with the frequency of the vibration applied to said second body by way of said second suspension system; and a control circuit operatively interposed between said sensor means and said control circuit being responsive to the inputs from said sensor means for selectively applying a voltage to said first and second electrodes.

DETAILED DESCRIPTION OF THE PREFERRED EMBODIMENTS

Figure 2:
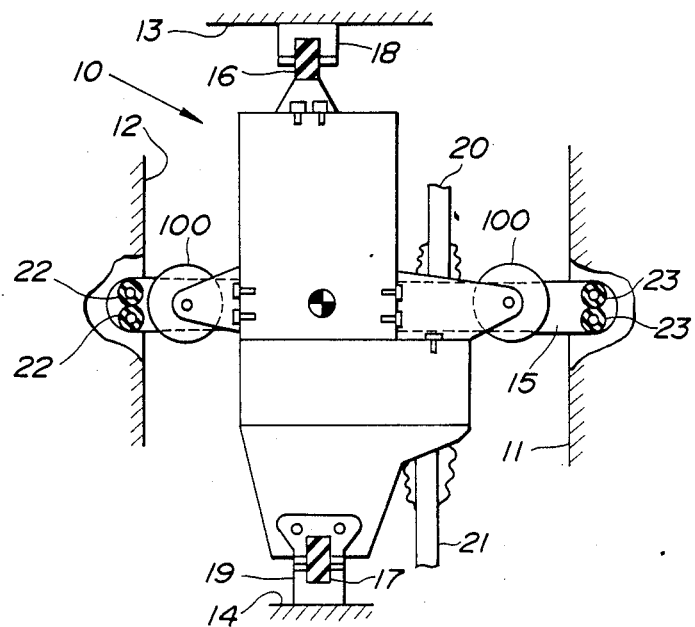
FIGS. 2 and 3 are schamatic plan and elevational views showing an engine and transaxle unit suspended on a vehicle chassis.
Figure 3:
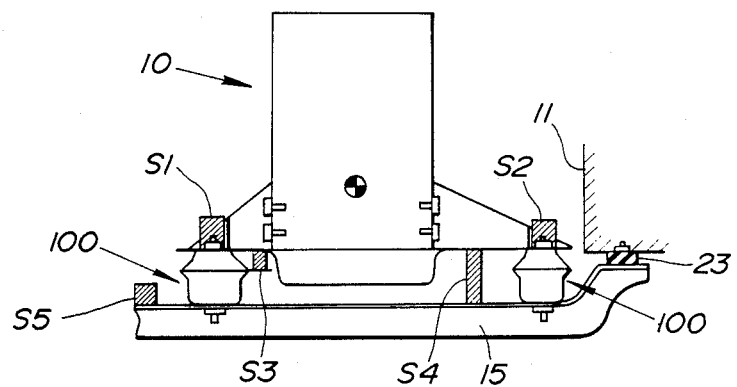

FIGS. 2 and 3 show a power unit generally denoted by the numeral 10 which is suspended on a vehicle chassis by way of a plurality of vibration damping mounts. In this arrangement the members of the chassis on which the power unit is supported comprise: a dash cross member 11, a first cross member 12 and side members 13, 14. The suspension arrangement also includes a center member 15, stopper insulators 16, 17, brackets 18 and 19, and drive shafts 20, 21. The center member 15 is connected to the cross members 11 and 12 by way of elastomeric bushes 22 and 23 and arranged to pass below the center of gravity of the power unit 10.

Figure 5:
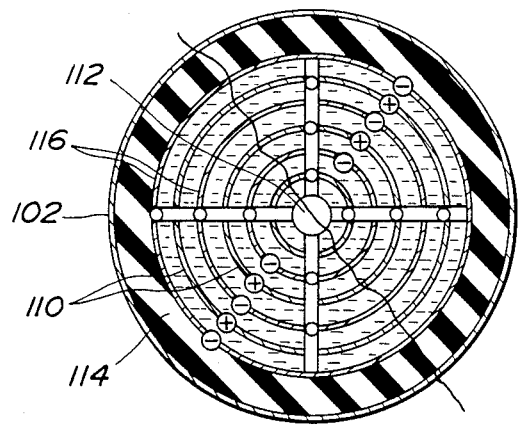
FIG. 5 is a sectional plan view as taken along section line V—V of FIG. 2.

Suspension units according to the present invention are used to support the power unit on the center member 15 in a manner which is as best seen in FIG. 5.

Figure 4:
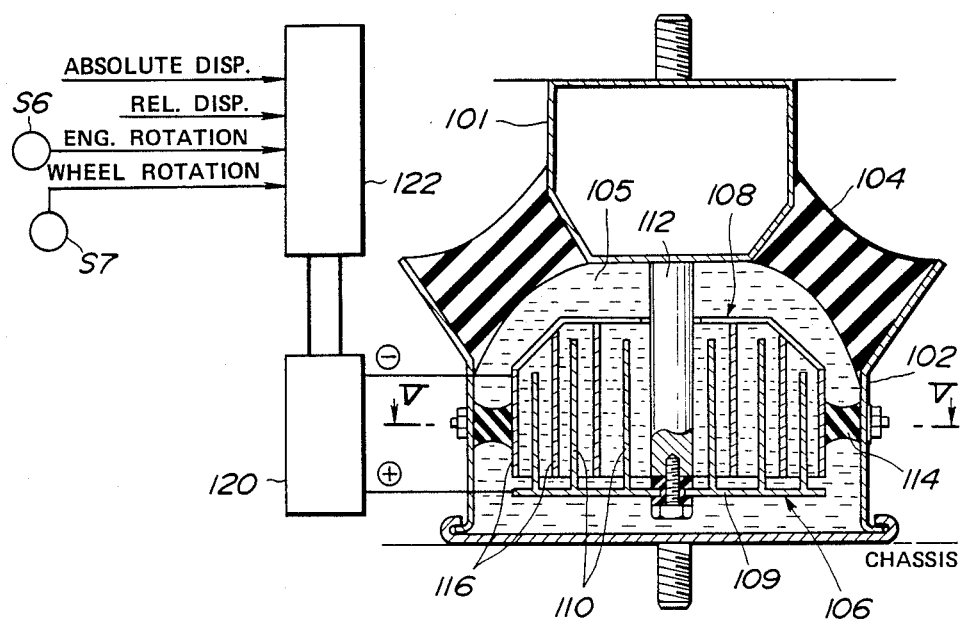
FIG. 4 is a sectional elevation showing the constructional features of a first embodiment of the present invention.

An embodiment of these units is shown in FIGS. 4 and 5. As will be appreciated from these figures, in this instance each unit consists of a metallic upper connection member 101 which can be detachably bolted to the power unit; a cup-like housing member 102; and an annular elastomeric body 104 which acts as a spring and which is securely connected to the connection member 101 and the housing member 102 in a manner to define a hermetically sealed chamber 105 within the housing member 102.

In this embodiment the chamber 105 is filled with a fluid which exhibits rheopetic properties.

First and second electrode bodies 106, 108 are suspended within the chamber 105. In this case the first electrode body 106 comprises an X-shaped base member 109 and a plurality of cylindrical plates 110 which are fixedly connected to, and which extend upwardly from the base 109. The base 109 is insulatedly connected by way of an elastomeric grommet (no numeral), to the lower end of a shaft 112 which extends through the chamber and which is fixed at its upper end to the connection member 101.

The second electrode body 108 is formed in a manner similar to the first and insulatingly suspended within the housing member by way of an annular elastomeric ring member 114. As shown, the annular elastomeric ring 114 is secured at its outer periphery to the inner wall of the housing member 102 and at its inner periphery to the outermost one of the cylindrical electrode plates 116 of the second electrode body 108. The cylindrical plates 116 of the second electrode body 108 are arranged to interleave between those (110) of the first one (106).

The first and second electrode bodies 106, 108 are electrically connected with a source of voltage (in this instance a DC/DC converter) 120 and thus define an arrangement wherein the viscosity of the fluid which fills the annular spaces defined between the cylindrical plates 110, 114, can be increased by the impression of a predetermined voltage across the two electrode bodies (viz., the so called Winslow effect).

The voltage source 120 is connected with a control circuit 122 which, as shown, is arranged to receive data input signals indicative of the relative dispacement of the mount, the absolute displacement of the mount, engine speed, and wheel speed.

Figure 1:
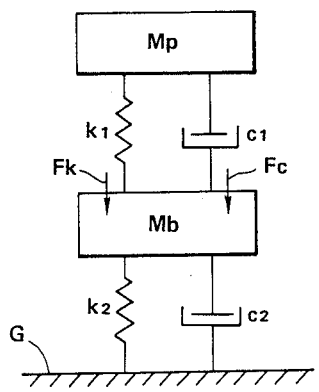
FIG. 1 shows the first of two prior art arrangements discussed in the opening paragraphs of the instant invention.
Figure 6:
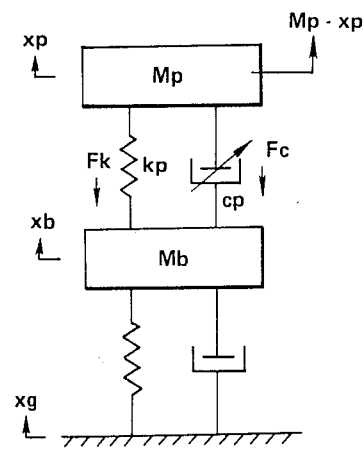
FIG. 6 is a model showing the conceptual arrangement of the first embodiment.

In operation, the above described arrangement is such as to function in a manner which can be depicted by the model shown in FIG. 6 and wherein depending on the voltage which is impressed across the cylindrical electrode members 110, 114 the viscosity of the fluid (which is located between the same) can vary from a free flowing value to an almost solid state. As will be readily appreciated, this of course defines a variable orifice which can be selectively controlled.

From FIG. 6 it will be appreciated that:

$$Mp \cdot xp = Fk - Fc \qquad (1)$$

Given that $Fk = -kp(xp - xb)$ it can be shown that:

$$Fc = cp(xp - xb) \qquad (2)$$

Figure 7:
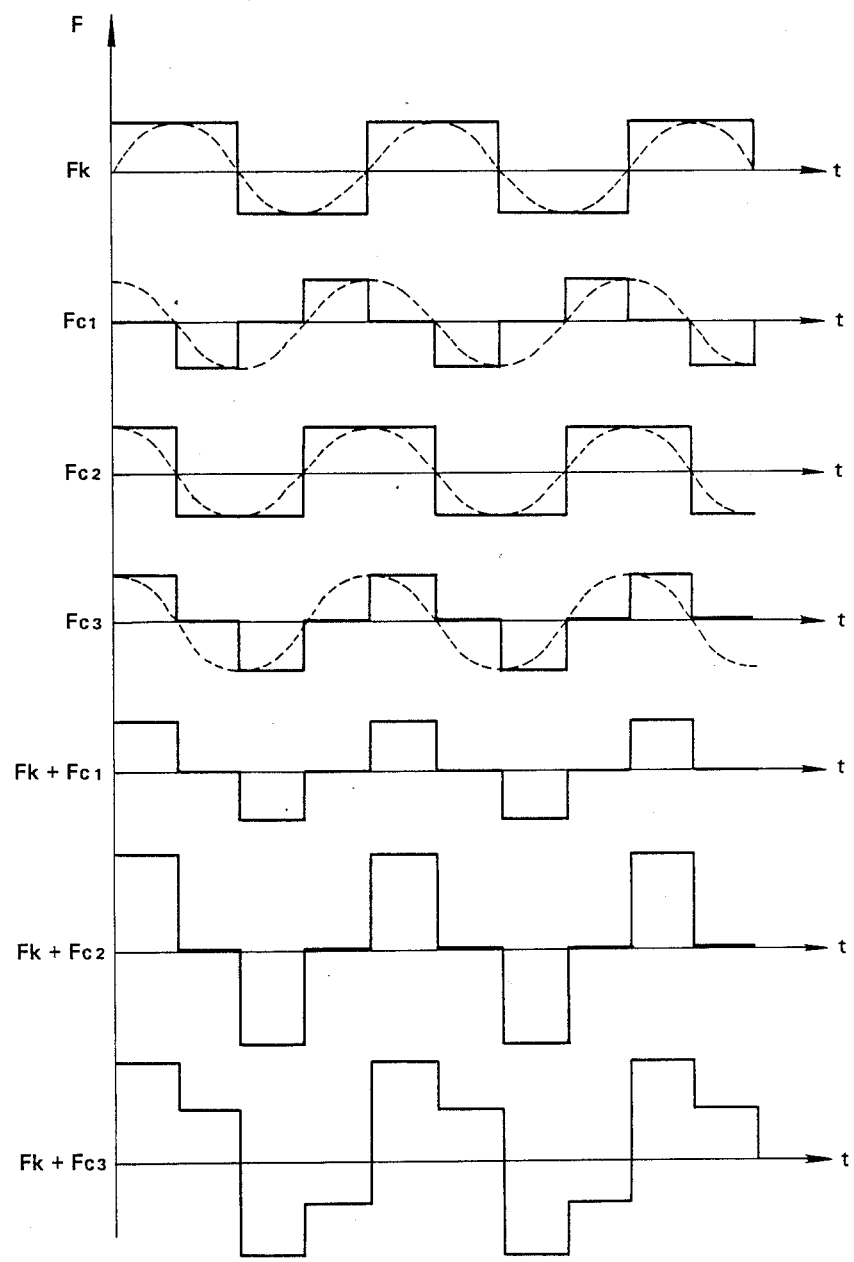
FIG. 7 is a timing chart which shows the various modes in which voltage is applied to the electrodes of the embodiments of the present invention.

If the applied voltage is switched ON-OFF and OFF-ON at a frequency twice that of the frequency of the displacement, the damping force Fc shifts from a 90° phase difference with respect to the spring force Fk which as shown in the upper section of FIG. 7, and acts in combination of Fc1, Fc2 and Fc3 damping components.

As shown, Fk+Fc1, Fk+Fc2 and Fk+Fc3 assume the characteristics shown in the lower half of FIG. 7 and exhibit a damping relationship wherein Fc3 > Fc2 (predetermined voltage) > Fc1 > zero volt.

Figure 8:
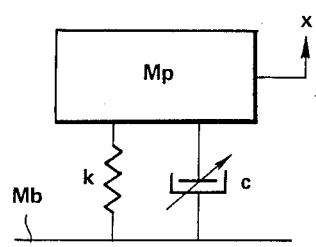
FIG. 8 is a model showing the condition the first embodiment can be deemed to assume when undergoing sudden acceleration/deceleration or when tranversing a rough road.
Figure 9:
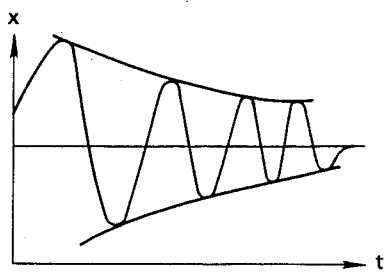
FIG. 9 is a chart which shows in terms of time and displacement, the damping characteristics provided when the first embodiment is operated on the basis of the model shown in FIG. 8.

With the above described arrangement, when the vehicle to which the mount is applied, is subject to sudden acceleration/deceleration or traverses a rough road, large displacement occurs and is accompanied with either stepwise or random large amplitude vibration such as roll or vertical movement of the power unit. Under these conditions the system can be assumed to be one which has a single degree of freedom and which can be expressed in the manner shown in FIG. 8. In this case the damping coefficient c assumes a large value and vibration control is quickly achieved in the manner illustrated in FIG. 9.

In other words, the relative and absolute displacements of the mount are monitored and in the event that large displacement power input is occuring, the control circuit 122 responds and issues a signal which indicates the need for high level damping. In response to this signal the maximum voltage is impressed across the electrode bodies 106, 108.

This causes the rheopetic fluid which is located between the electrodes to become extremely viscous and the large amplitude vibration is quickly attenuated.

Figure 10:
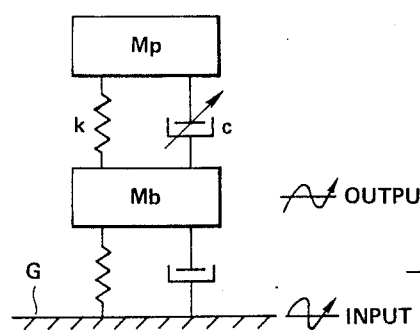
FIG. 10 is a model showing the condition the first embodiment can be deemed to assume when the vehicle in which the suspension units according to the present invention are disposed, is traversing a smooth road.

On the other hand, when the vehicle is traversing a smooth road, the main source of vibration to be damped takes the form of small amplitude vibration which is produced due to wheel imbalance or other factors such as minor fluctuations in the road surface. Under these conditions the vibration input can be depicted as a sine wave and the system can be expressed as a model having 2 degrees of freedom (see FIG. 10). The characteristics of the vibrational force transmitted to the vehicle chassis under these conditions is shown in FIG. 11 in terms of damping coefficient c plotted against the frequency of the applied vibration.

Figure 11:
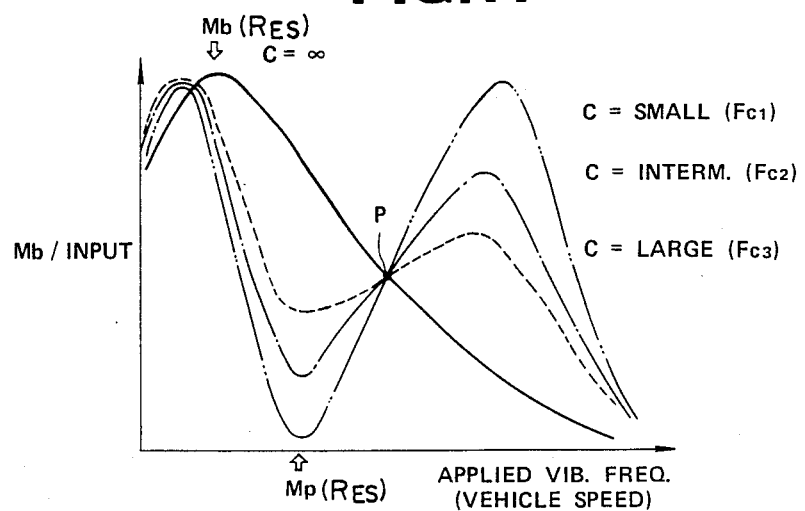
FIG. 11 is a chart which shows in terms of damping characteristics and applied vibration frequency the changes in vibration transmission which occur with the first embodiment of the present invention.

Under these conditions, when the monitored relative displacement of the mount and the wheel rotational speed indicate a small sine wave type vibration the nature of the vibration is analysed and compared with a predetermined value P (see FIG. 11).

While the vibration frequency remains below P, a zero voltage is impressed across the electrode bodies 106, 108. However, when the vibration frequency reaches and/or exceeds the P value, a voltage having either a maximum value or one which corresponds to Fc3 is applied to the electrode bodies 106, 108.

In accordance with this operation, when the vibrational frequency exceeds P, the viscosity of the fluid between the electrodes rises to a high level and essentially all of the vibration which tends to be transmitted to the vehicle chassis is attenuated to a minimum level.

Figure 12:
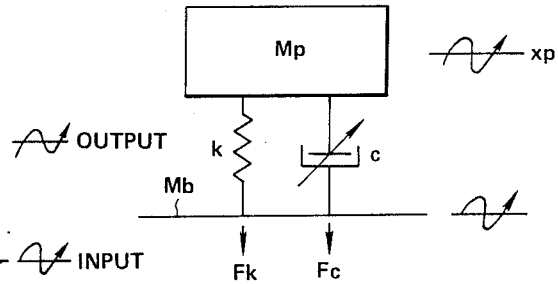
FIG. 12 is a model which shows the condition the first embodiment can be deemed to assume when the vehicle is at standstill and the engine is idling.
Figure 13:
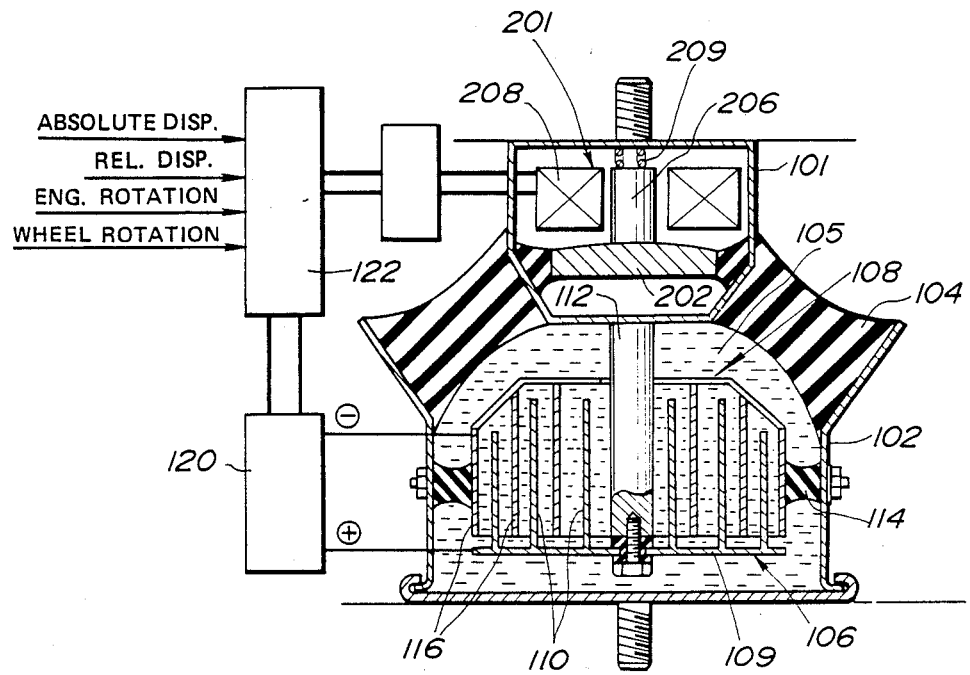
FIG. 13 is a sectional elevation showing a second embodiment of the present invention.

When the engine is idling and the vehicle is at standstill, the vibration which is transmitted to the vehicle chassis takes the form of a sine wave and the system under these conditions can be expressed as a model having a single degree of freedom (see FIG. 12) and wherein the camping coefficient c is reduced.

Under these circumstances the engine speed signal is monitored and the frequency of the predominant vibration of the engine determined. As is well known, in the case of four and eight cylinder engines the secondary vibration is the strongest while in the case of 6 cylinder engines the tertiary vibration is most predominant. In the event that the engine speed signal is indicative of idling the control circuit responds in manner wherein it issues a signal which induces either a low (Fc1) or zero voltage to be applied to the electrode bodies 106, 108. This reduces the damping force Fc and permits the Fc component of Ftotal to be reduced in a manner which reduces the vibration transmission between the power unit and the vehicle chassis.

With the first embodiment the following advantages are derived.

1. As the viscosity of fluid which is located between the plates 110, 116 of the electrode bodies 106, 108 can be varied by applying different voltages across the same, it is possible to vary the viscosity of the fluid from an essentially negligible value to a near solid state and thus take advantage of the change in flow resistance which occurs. It is also possible to take advantage of the resonating fluid column properties in a manner which eliminates the need for difficult resonance frequency tuning and thus enable damping over a wide frequency range which spans both high and low frequencies. Accordingly, it is possible to screen out vibration which not only originates from the power unit but also the road surface and the vehicle suspension.

2. As the mounting units are disposed proximate the center of gravity of the power unit 10 both vertical and rolling movement of the same can be damped effectively.

3. As the elastomeric bushes 22, 23 which are interposed between the center member 15 and the vehicle chassis, it is additionally possible to screen out high frequency vibration (e.g. engine noise).

FIGS. 13 to 17 disclose a second embodiment of the present invention. The construction of this device is essentially similar to the first embodiment, however, features the addition of a vibration generator 201 which, in this case, is disposed in the metallic connection member 101.

As shown, the vibration generator 201 includes a mass 202 which is suspended within the interior of the connection member 101 by way of an annular elastomeric member 204. The mass 202 includes a shaft-like portion 206 which extends through a solenoid 208 which is mounted in the connection member 101. A spring 209 is disposed between the top of the shaft like portion 206 and the connection member.

The coil or coils of the solenoid 208 are electrically connected with a second voltage source 210 which in this embodiment takes also the form of a DC/DC converter. The second voltage source 210 is operatively connected with the control circuit 122 in a manner wherein the solenoid can be selectively energized in a manner which induces the mass 202 to vibrate in either an inphase or reverse phase mode.

Figure 14:
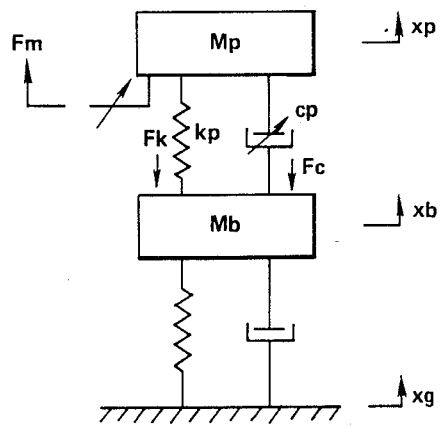
FIG. 14 is a model which shows the second embodiment as applied to an automotive vehicle.

The operation of the second embodiment is essentially the same as that of the first one and differs in that a vibration Fm can be selectively generated. The second embodiment can be depicted as shown in FIG. 14. Viz., in the form of a model wherein Fk denotes the spring force, Fc denotes the damping force and Fm denotes the internally generated vibrational force. The above arrangement is such that $$Mpxp = Fk - Fc + Fm \quad (3)$$

Figure 15:
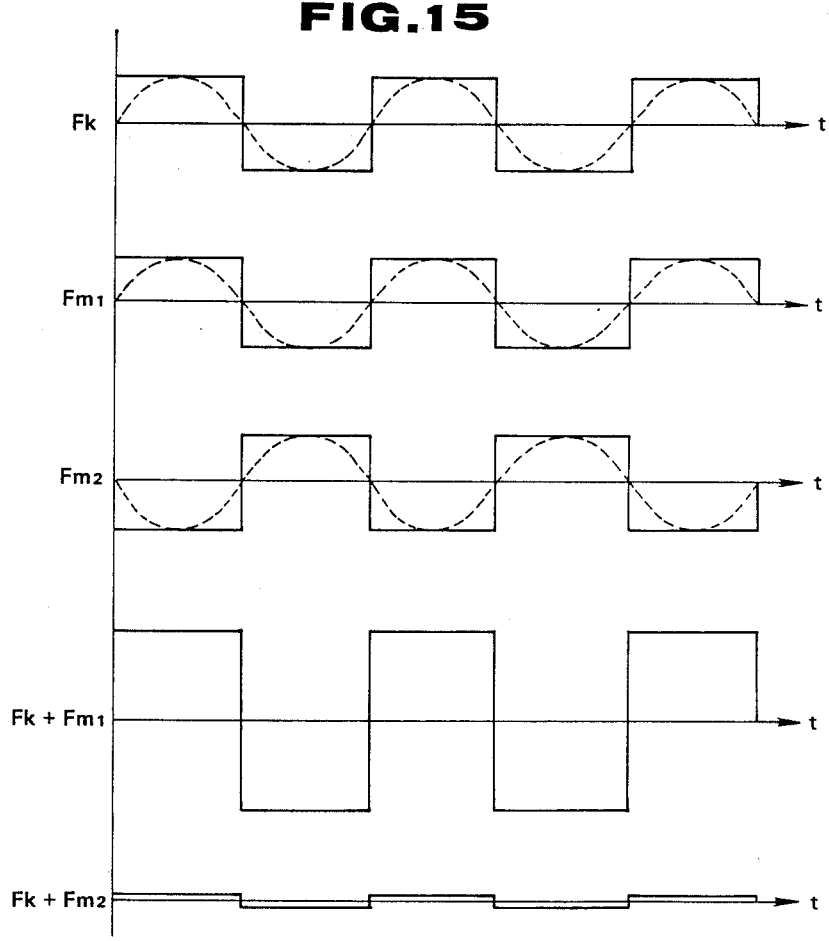
FIG. 15 is a timing chart showing the modes in which voltage is applied to the vibration generator which forms a vital part of the second embodiment.

As shown in FIG. 15, the inphase and reverse phase modes of vibration produced by the vibration generator 201 cooperate with the spring force Fk in a manner wherein Fk+Fm1 amplifies and wherein Fk+Fm2 attenuates.

When the vehicle is subject to rapid acceleration or deceleration, or traverses a rough road, large amplitude vibrations are produced which occur either in stepwise or in a random manner due to the rolling or vertical movement of the power unit 10. Under these conditions however, it is difficult to determine the exact phase of the vibrations being applied and to produce the appropriate control. Accordingly, no vibration is generated.

When the vehicle is running on a smooth road the main source of vibration to be damped takes the form of small amplitude vibration which is produced due to wheel imbalance or other factors such as minor fluctuations in the road surface.

Figure 17:
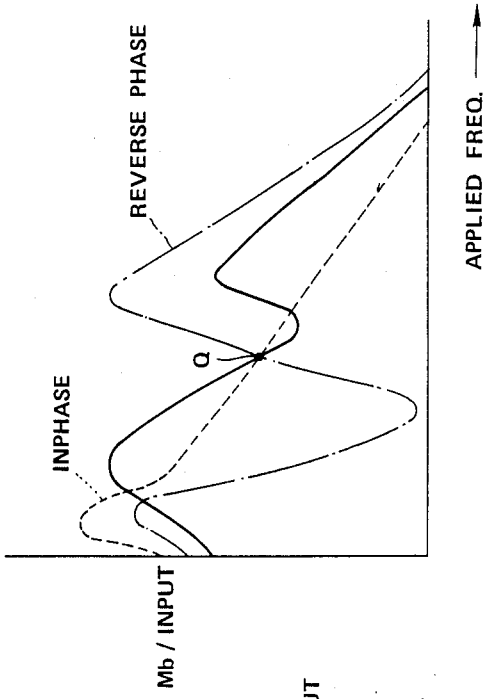
FIG. 17 shows in terms of applied vibration frequency, the changes in the transmitted vibration which occur in accordance with the second embodiment of the present invention.
Figure 16:
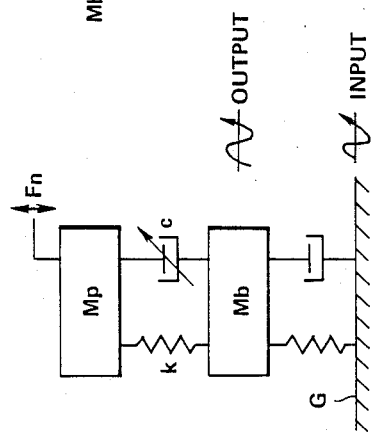
FIG. 16 is a model which depicts the second embodiment during running on a smooth road.

Accordingly, the vibration input can be depicted as a sine wave and the system can be expressed as a model having 2 degrees of freedom (see FIG. 16). As shown in FIG. 17, when the inphase Fm vibration is applied the operational characteristics of the damping unit change from those shown in solid lines to those shown in broken lines. On the other hand, when the reverse phase Fm vibration is applied the operational characteristics change from those indicated by solid lines to those indicated in phantom.

By monitoring the relative displacement of the mounting unit, it is possible to determine the presence of a small amplitude vibration and to calculate the frequency of the same. While the vibrational frequency is lower than that denoted by point Q the control circuit 122 functions to induce the generation of reverse phase vibration in the mass. This produces a dynamic damping function. When the vibration frequency exceeds that denoted by point Q the control circuit 122 is arranged to switch the vibration generation to the inphase mode.

In accordance with this control it is possible to reduce the transmission of vibration to the vehicle chassis over an essentially complete vibrational spectrum.

When vibration is produced in the inphase mode, the mass of the power unit Mp and the mass of the chassis Mb act essentially as the same single mass and the relative displacement between the power unit 10 and the chassis decreases with the result that, if suitable tuning is not implemented, under extreme conditions engine noise and shock are transmitted to the chassis.

Alternatively, when the vehicle is running on a smooth road it is possible to control the vibration generation independently of the control of the voltage which is applied across the electrode bodies 106, 108 if so desired.

Figure 18:
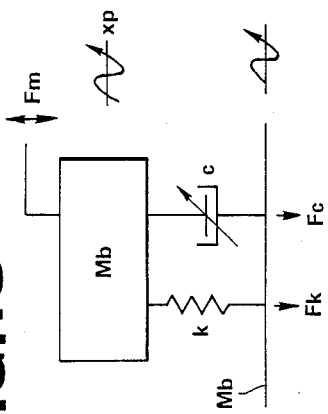
FIG. 18 is a model showing the second embodiment during engine idling.

During idling with the vehicle at standstill, the vibration applied to the vehicle chassis from the power unit 10 takes the form of a sine wave and the system can be expressed in the form of a model having a single degree of freedom (see FIG. 18). Under these conditions, the reverse phase of the vibration Fm is generated in a manner which cancels the the applied frequency displacement xp of the power unit mass Mp.

In other words when the engine rotational speed signal assumes a level indicative of engine idling the control circuit 122 responds by inducing the mass 204 to undergo the above mentioned reverse phase vibration. This, as will be understood from the above is such as to attenuate vibration which tends to be applied to the vehicle chassis under such conditions.

In this situation also, as the damping coefficient is fixed at a predetermined level, it is within the scope of the present invention to control the operation of the vibration generator 201 independently of the control which is applied in connection with the application of voltage to the electrode bodies 106, 108.

With the second embodiment, in the case the amount of vibration which is transmitted to the chassis from the power unit 10 and the like is attenuated by the combined operation of the electrode bodies 106, 108 and vibration generator 201 it is possible to achieve the minimum of chassis vibration by inducing the mounting member or members to produce the ideal power unit suspension characteristics.

It will be noted that the present invention is not limited to the above disclosed embodiments and that the concepts on which the invention is based can be applied in different ways without departing from the spirit of the present invention. For example, it is possible to vary the level of voltage applied to the electrode bodies in an analog type manner wherein the level is varied continously from zero to a maxium level.

In order to produce the absolute and relative displacement signals which are fed to the control circuit 122, a number of sensor arrangements are possible. By way of example only, it is possible to locate sensors in the areas denoted by hatching in FIG. 3. These sensors may take any suitable form—such as G sensors (accelerometers) sliding resistance types and the like.

In the event that both parameters are derived by using two accelerometers, one located on the power unit 10 and the other on the center member 15 (e.g. S1 and S5), the absolute displacement value can be derived by subjecting the acceleration signal produced by the engine mounted accelerometer S1 (or S2) to two sequential integrations in order to obtain the displacement value. On the other hand, the relative displacement signal can be derived by integrating the outputs of both sensors twice and subtracting the difference.

Alternatively, sliding resistance type sensors can be disposed between the power unit 10 and the housing member 102 (S3) and between the power unit 10 and the center member 15 (S4).

The engine speed signal and the wheel speed signals can be derived using various well known sensor arrangements (e.g. sensors S6 and S7 shown in FIG. 4). The engine speed signal should however be modified in accordance with the number of cylinders of the engine and thus represent the strongest vibration which tends to be produced by the same.

As the further alternative arrangement which are possible are easily within the scope of those skilled in the art to which the present invention applies, given the above disclosure, no further description is deemed necessary.

What is claimed is:

1. A system comprising:
  a first vibratable body;
  a second vibratable body;
  first and second suspensions, said first suspensions suspending said first vibratable body on said second vibratable body, and said second suspension suspending said second vibratable body on a surface, said first suspension including a mounting device for damping vibration which is applied to said second vibratable body from said first vibratable body by way of said first suspension and from said surface by way of said second suspension, said mounting device comprising:
  a housing, said housing containing a a fluid exhibiting electrorheopectic properties;
  first and second electrode structures suspended in said housing in a manner to be immersed in said electrorheopectic fluid, said first electrode structure being operatively connected with said first vibratable body so as to be movable therewith, said second electrode structure being connected to said housing through a resilient member, said electrorheopectic fluid undergoing a change in viscosity when a voltage is applied across said first and second electrode structures;

a spring, said spring being operatively connected to both said first vibratable body and said first electrode structure, said spring being subject to compression when the relative displacement between said first and second vibratable bodies decreases;

sensor means for sensing:

absolute displacement of said mount;

relative displacement of said mount;

a first predetermined parameter which varies with the vibration produced by said first vibratable body; and a second predetermined parameter which varies with the frequency of the vibration applied to said second vibratable body by way of said second suspension;

a control circuit operatively interposed between said sensor means and said first and second electrode structures, said control circuit being responsive to inputs from said sensor means for selectively applying the voltage to said first and second electrode structures; and a vibration generator, said vibration generator being arranged in a manner to selectively produce preselected vibrations; wherein said spring takes the form of an elastomeric member which is operatively connected between said housing and a connection member, said connection member being detachably connected to said first vibratable body, said elastomeric member and said connection member closing said housing in a manner to define a closed chamber therein, said vibration generator is disposed in said connection member and operative to selectively produce predetermined vibrations.

2. A system as claimed in claim 1, wherein said first and second electrode structures respectively include a plurality of annular plates, the annular plates of said first electrode structure being interleaved in a contact free relationship with the annular plates of said second electrode structure.

3. A system as claimed in claim 1 wherein said first vibratable body is a power unit including an engine, said second vibratable body is a vehicle chassis, said first suspension includes a plurality of elastomeric members, said second suspension suspends said vehicle chassis on a road surface by way of a road wheel, and said sensor means includes an engine speed sensor and a road wheel speed sensor.

4. A system as claimed in claim 1 wherein said sensor means comprises first and second accelerometers, said first accelerometer being mounted in a manner to be responsive to the movement of said first vibratable body, said second accelerometer being responsive to the movement of a member forming part of said first suspension.

5. A system as claimed in claim 1 wherein said sensor means comprises first and second sliding resistance type sensors, said first sliding resistance type sensor being connected between said first body and said housing, said second sliding resistance type sensor being connected between said first body and a member of said said first suspension system.

6. A system as claimed in claim 1 wherein said vibration generator comprises a mass which is suspended on a resilient member, and a solenoid, said solenoid being operatively connected to said control circuit and arranged to induce said mass to move when being supplied with an energizing current from said control circuit.

7. A system as claimed in claim 6 wherein said vibration generator is connected with said control circuit in a manner to be selective energized in response to the inputs from said sensor means.

8. A system comprising:

a first vibratable body;

a second vibratable body;

first and second suspensions, said first suspension suspending said first vibratable body on said second body, and said second suspension suspending said second vibratable body on a surface;

a cup-shaped housing, said cup-shaped housing being connected to said second vibratable body, said cup-shaped housing having a totally rigid construction, said cup-shaped housing having a single mouth;

an elastomeric member disposed in said single mouth, said elastomeric body hermetically closing said mouth in a manner to define a single discrete chamber, said chamber being totally filled with an electrorheopectic fluid;

a connector, said connector being disposed in said elastomeric member, said connector being detachably connected to said first vibratable body;

a shaft, said shaft being rigid with said connector and arranged to extend into said single discrete chamber;

a first electrode structure, said first electrode structure including:

a first base, said first base being connected to said cup-shaped housing, said first base also being connected to one end of said shaft;

a first plurality of essentially coaxial annular rib-like projections which extend normally from said first base toward said connector in a manner to partially surround said shaft;

a second electrode structure, said second electrode structure including:

a second base, said second base being formed with an aperture through which said shaft extends;

a second plurality of essentially coaxial annular rib-like members which extend normally from said second base, said second plurality of rib-like members being arranged to be interleaved in a spaced contact free relationship with said first plurality of rib-like members;

an annular elastomeric member which is fixedly connected to the inner periphery of said housing, and to an outermost of said plurality of annular rib-like members of said second electrode structure;

sensor means for sensing:

absolute displacement of said mount;

relative displacement of said mount;

a first predetermined parameter which varies with the vibration produced by said first vibratable body; and a second predetermined parameter which varies with the frequency of the vibration applied to said second vibratable body by way of said second suspension; and a control circuit operatively interposed between said sensor means and said first and second electrode structures, said control circuit being responsive to inputs from said sensor means for selectively applying the voltage to said first and second electrode structures.

* * * * *